J. BROWN.
Weighing Attachment Applied to Faucets.
No. 13,776. Patented Nov. 13, 1855.
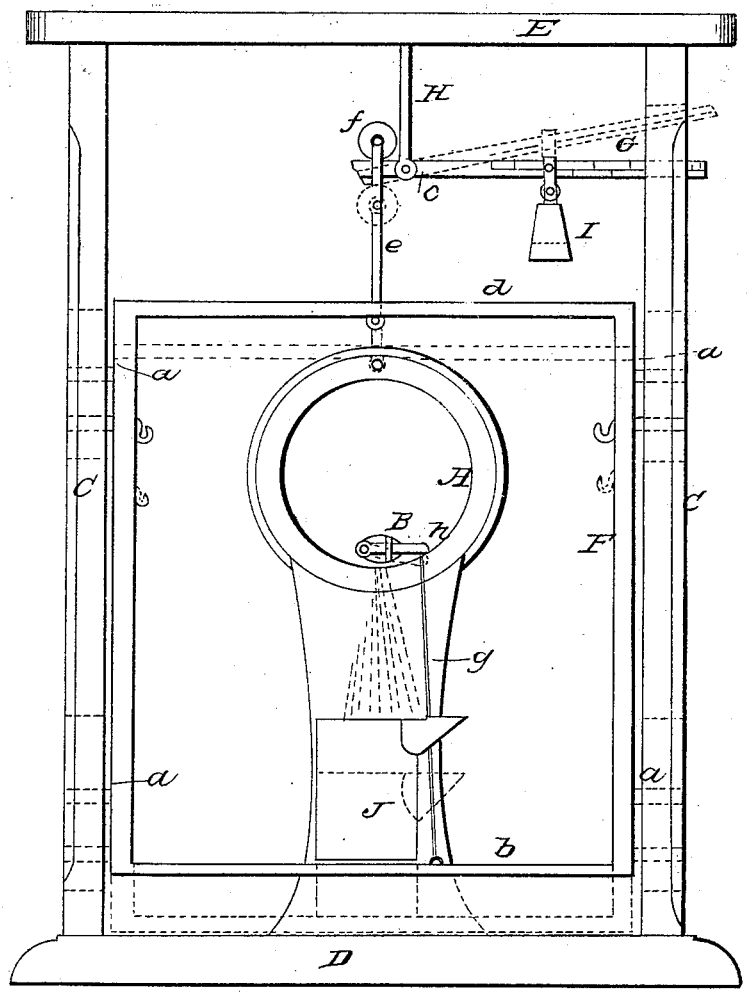

UNITED STATES PATENT OFFICE.

JOB BROWN, OF LAWN RIDGE, ILLINOIS.

WEIGHING ATTACHMENT FOR FAUCETS.

Specification of Letters Patent No. 13,776, dated November 13, 1855.

*To all whom it may concern:*

Be it known that I, JOB BROWN, of Lawn Ridge, in the county of Marshall and State of Illinois, have invented a new and Improved Weighing Attachment to be Applied to Faucets, whereby liquids, grain, and other articles may be drawn from vessels in suitable quantities by weight; and I do hereby declare that the following is a full, clear, and exact description of the same, reference being had to the annexed drawing, making a part of this specification, said drawing being a front view of my improvement.

The nature of my invention consists in connecting a weighing machine, constructed and arranged as will be presently shown, to a faucet, for the purpose of drawing liquids, grain and other articles from vessels in given quantities by weight, the weighing machine operating the faucet so as to cut off the discharge of liquid or other articles from the vessel when the desired quantity has escaped.

To enable others skilled in the art to fully understand and construct my invention, I will proceed to describe it.

A, represents a cask or other vessel and B, represents a gate faucet placed therein, C, C, are two uprights the lower ends of which are attached to a suitable base D. The upper ends of the uprights are connected by a cross piece E.

F, represents a rectangular frame which is fitted between the uprights C, C. The side pieces of this frame have pins or rods (*a*) projecting from them, the pins or rods working in slots in uprights and forming guides for the frame F. The lower cross piece (*b*) of the frame F, is made rather broad so as to form a platform.

G, represents a scale beam of usual construction, and H, is a rod attached to the center of the cross piece E, of the uprights. The beam G, is suspended to the lower end of the rod H, by a pivot (*c*) which is the fulcrum of the beam.

To the center of the upper cross piece (*d*) of the frame F, there is attached a rod (*e*) which is forked at its upper end and has a pulley (*f*) fitted within it.

The platform (*b*) of the frame F, has a cord (*g*) attached to it, said cord being connected to the end of the gate (*h*) of the faucet.

Operation: The poise weight I, is placed upon the beam G, at the desired point or at the mark indicating the number of pounds, or weight intended to be drawn from the vessel A. The frame F, is then raised and the pulley (*f*) placed over the short end of the beam G. In raising the frame F, the gate (*h*) raises either by a spring or other device and the liquid or other article in the vessel A, will pass out of the vessel A, into the receptacle J, placed on the platform (*b*) to receive it. When the article in the receptacle J, counterbalances the poise weight I, the short end of the beam G, will be depressed and the pulley (*f*) will roll off the beam, the frame F, descends and the cord (*g*) draws down the gate (*h*) and cuts off the discharge from the faucet B.

By the above improvement liquids, grain, etc., may be drawn from casks, or vessels, in given quantities by weight, the drawing and weighing being done at the same time and requiring no additional labor.

The invention is simple, and economical to apply in all cases. Any proper form of faucet may be used, as the cord (*g*) by a simple lever attachment may be made to turn a spigot.

The pulley (*f*) rolls off of the beam G, every time the measure or receptacle has the requisite quantity of material in it and consequently the faucet is operated quickly. If the faucet were operated merely by the descending weight of the receptacle and its contents the material passing from the cask or other vessel would not be cut off with sufficient quickness, for the beam G, would oscillate on its axis similar to ordinary scales. It would be impossible to weigh accurately in this way. By my improvement the pulley (*f*), rolls off the beam as soon as it is slightly inclined and the faucet is acted upon instantaneously and the flow of the material from the cask suddenly stopped.

Having thus described my invention, what I claim as new and desire to secure by Letters Patent, is—

Attaching or connecting the frame F, to the scale beam G, by means of the pulley (*f*) resting upon the short end of the beam, and attaching a cord (*g*) to the platform (*b*) of the frame F, and the gate or spigot of a faucet of the vessel A, the above parts being arranged substantially as shown for the purpose specified.

JOB BROWN.

Witnesses:
CHARLES STONE,
M. E. KELLOGG.